US012601493B2

(12) United States Patent
Steele

(10) Patent No.: US 12,601,493 B2
(45) Date of Patent: Apr. 14, 2026

(54) COMBUSTORS AND METHODS OF MITIGATING THERMOACOUSTIC INSTABILITIES IN A GAS FLOW

(71) Applicant: ROLLS-ROYCE plc, London (GB)

(72) Inventor: David Steele, Bristol (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 19/172,433

(22) Filed: Apr. 7, 2025

(65) Prior Publication Data

US 2025/0341189 A1     Nov. 6, 2025

(30) Foreign Application Priority Data

May 3, 2024     (GB) ..................................... 2406217

(51) Int. Cl.
  *F23R 3/34*     (2006.01)
  *F02C 7/264*     (2006.01)
  *F02C 9/28*     (2006.01)
(52) U.S. Cl.
  CPC .............. *F23R 3/343* (2013.01); *F02C 7/264* (2013.01); *F02C 9/28* (2013.01); *F05D 2220/323* (2013.01); *F05D 2240/35* (2013.01); *F05D 2260/964* (2013.01); *F23R 2900/00013* (2013.01)

(58) Field of Classification Search
  CPC .... F02C 7/264; F05D 2260/964; F23R 3/343; F23R 2900/00013
  See application file for complete search history.

(56) References Cited

U.S. PATENT DOCUMENTS

| | | |
|---|---|---|
| 2002/0092302 A1 | 7/2002 | Johnson et al. |
| 2009/0165436 A1 | 7/2009 | Herbon et al. |
| 2016/0356501 A1 | 12/2016 | Gomez del Campo |
| 2019/0186747 A1* | 6/2019 | Lowery ................ H05H 1/2441 |
| 2023/0265798 A1* | 8/2023 | Dam ........................ F23R 3/343 |
| | | 60/740 |

* cited by examiner

*Primary Examiner* — Scott J Walthour
(74) *Attorney, Agent, or Firm* — Oliff PLC

(57)     ABSTRACT

There is provided a heat engine 10 comprising a combustor 120 and a controller 290. The combustor 120 includes a fuel injection port 128 and a pilot 130. The controller 290 is configured to mitigate thermoacoustic instabilities in a gas flow A, B within the heat engine 10 by selectively energising 320 the pilot 130 to ignite fuel discharged from the fuel injection port 128. There is also provided a method 300 of mitigating thermoacoustic instabilities in a gas flow A, B within a heat engine 10 comprising a combustor 120 including a fuel injection port 128 and a pilot 130. The method 300 comprises selectively energising 320 the pilot 130 to ignite fuel discharged by the fuel injection port 128.

11 Claims, 6 Drawing Sheets

COMBUSTORS AND METHODS OF MITIGATING THERMOACOUSTIC INSTABILITIES IN A GAS FLOW

This disclosure claims the benefit of UK Patent Application No. GB 2406217.6 filed on 3 May 2024, which is hereby incorporated herein in its entirety.

BACKGROUND

Technical Field

The present disclosure relates to heat engines comprising a combustor and methods of mitigating thermoacoustic instabilities in a gas flow within a heat engine.

Background of the Disclosure

Acoustically-coupled combustion instabilities (e.g., thermoacoustic instabilities) are typically difficult to avoid at some operating conditions of a gas turbine engine (e.g., within one or more parts of an operating map of the gas turbine engine). Because there is often a high degree of coupling between gas vibration and a structure of the gas turbine engine, damage to engine components may swiftly follow the development of high levels of noise associated with thermoacoustic instabilities in a gas turbine engine.

The present disclosure has been devised with the foregoing in mind.

SUMMARY

According to a first aspect of the present disclosure, there is provided a heat engine comprising a combustor and a controller, wherein: the combustor includes a fuel injection port and a pilot; and the controller is configured to mitigate thermoacoustic instabilities in a gas flow within the heat engine by selectively energising the pilot to ignite fuel discharged from the fuel injection port. The heat engine may be a gas turbine engine. Selectively energising the pilot may include repeatedly or discontinuously energising the pilot.

It may be that the controller is configured to: monitor a parameter relating to the heat engine; and selectively energise the pilot based on the monitored parameter.

The parameter may be a thermofluidic parameter associated with the gas flow within the heat engine or an operational parameter associated with an operating point of the heat engine.

The heat engine may be configured so that a flame resulting from energisation of the pilot to ignite fuel discharged from the fuel injection port is blown-off across at least a part of an operating map of the heat engine.

It may be that: the combustor comprises a plurality of fuel injection ports and a plurality of pilots; and/or the controller is configured to mitigate thermoacoustic instabilities in the gas flow within the heat engine by selectively energising each pilot to ignite fuel discharged from a respective one of the plurality of fuel injection ports.

It may be that the heat engine is configured so that a flame resulting from energisation of the pilot to ignite fuel discharged from the respective fuel injection port is blown-off across at least a part of an operating map of the heat engine.

It may be that at least a subset of the plurality of fuel injection ports are radially distributed with respect to a centreline of the heat engine. It may be that at least a subset of the plurality of fuel injection ports are angularly distributed around a centreline of the heat engine.

It may be that the combustor forms a part of an afterburner of the heat engine.

The combustor may be an auxiliary combustor. The heat engine may further comprise a main combustor. The main combustor may be disposed axially upstream of a turbine stage of the heat engine. The main combustor and the auxiliary combustor may both form a part of the afterburner of the heat engine.

According to a second aspect of the present disclosure, there is provided a heat engine comprising a combustor, wherein: the combustor includes a fuel injection port and a pilot; and the heat engine is configured so that a flame resulting from energisation of the pilot to ignite fuel discharged from the fuel injection port is blown-off across at least a part of an operating map of the heat engine.

In accordance with the first aspect of the second aspect, the heat engine may be configured so that a flame resulting from energisation of the pilot to ignite of fuel discharged from the fuel injection port is blown-off across at least 10% of, or a majority of, the operating map of the heat engine. In accordance with the first aspect or the second aspect, the heat engine may be configured so that a flame resulting from energisation of the pilot to ignite of fuel discharged from the fuel injection port is blown-off across at least 90% of, or an entirety of, the operating map of the heat engine.

In accordance with a third aspect of the present disclosure, there is provided aircraft comprising a heat engine according to the first aspect or the second aspect.

In accordance with a fourth aspect of the present disclosure, there is provided a method of mitigating thermoacoustic instabilities in a gas flow within a heat engine comprising a combustor including a fuel injection port and a pilot, the method comprising: selectively energising the pilot to ignite fuel discharged by the fuel injection port.

It may be that the method comprises: monitoring a parameter relating to the heat engine; and selectively energising the pilot based on the monitored parameter.

The parameter may be a thermofluidic parameter associated with the gas flow within the heat engine or an operational parameter associated with an operating point of the heat engine.

It may be that the heat engine is configured so that a flame resulting from energisation of the pilot to ignite fuel discharged from the fuel injection port is blown-off across at least a part of an operating map of the heat engine.

It may be that the combustor comprises a plurality of fuel injection ports and a plurality of pilots, and wherein the method comprises: selectively activating each of the plurality of pilots to ignite fuel discharged by a respective one of the plurality of fuel injection ports.

According to a fifth aspect of the present disclosure, there is provided a computer program comprising instructions which, when the program is executed by a controller provided to a gas turbine engine comprising a combustor including a fuel injection port and a pilot, cause the controller to carry out a method in accordance with the fourth aspect.

According to a sixth aspect of the present disclosure, there is provided a computer-readable medium having stored thereon a computer program in accordance with the fifth aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only by the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The diameter of the fan may be measured across the engine centreline and between the tips of opposing fan blades at their leading edge. The fan diameter may be greater than (or on the order of) any of: 50 cm, 60 cm, 70 cm (around 27.5 inches), 80 cm (around 31.5 inches), 90 cm, 100 cm (around 39 inches), 110 cm (around 43 inches), 120 cm (around 47 inches), 130 cm (around 51 inches), 140 cm (around 55 inches), 150 cm (around 59 inches), or 160 cm (around 63 inches). The fan diameter may be in an inclusive range bounded by any two of the values in the previous sentence (i.e., the values may form upper or lower bounds), for example in the range of from 50 cm to 70 cm or 90 cm to 130 cm.

The fan face area may be calculated as IT multiplied by the square of the fan tip radius.

The rotational speed of the fan may vary in use. Generally, the rotational speed is lower for fans with a higher diameter. Purely by way of non-limitative example, the rotational speed of the fan at cruise conditions may be less than 10000 rpm, for example less than 9000 rpm. Purely by way of further non-limitative example, the rotational speed of the fan at cruise conditions for an engine having a fan diameter in the range of from 50 cm to 90 cm (for example 60 cm to 80 cm or 65 cm to 75 cm) may be in the range of from 7000 rpm to 22000 rpm, for example in the range of from 7000 rpm to 16000 rpm, for example in the range of from 7500 rpm to 14000 rpm. Purely by way of further non-limitative example, the rotational speed of the fan at cruise conditions for an engine having a fan diameter in the range of from 90 cm to 150 cm may be in the range of from 4500 rpm to 12500 rpm, for example in the range of from 4500 rpm to 10000 rpm, for example in the range of from 6000 rpm to 10000 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.22, 0.23, 0.24, 0.25, 0.26, 0.27, 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e., the values may form upper or lower bounds), for example in the range of from 0.28 to 0.31, or 0.29 to 0.3.

Turbofan gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 0.4, 0.5, 0.6, 0.7, 0.8, 0.9, 1.0, 1.1, 1.2, 1.3, 1.4, 1.5, 1.6, 1.7, 1.8, 1.9, 2.0, 2.4, 2.8, 3.2, 3.6, or 4.0. The bypass ratio may be in an inclusive range bounded by any two of the values in the previous sentence (i.e., the values may form upper or lower bounds), for example in the range of from 0.4 to 1.0, 0.5 to 0.9, or 0.6 to 0.9. Alternatively, the bypass ratio may be in a bounded range in the form of 1.0 to 4.0, 1.8 to 3.6, or 2.4 to 3.6. The bypass duct may be substantially annular. The bypass duct may be radially outside the core engine. The radially outer surface of the bypass duct may be defined by a nacelle and/or a fan case.

The overall pressure ratio of a turbofan gas turbine engine as described and/or claimed herein may be defined as the ratio of the stagnation pressure upstream of the fan to the stagnation pressure at the exit of the highest-pressure compressor (before entry into the combustor). By way of non-limitative example, the overall pressure ratio of a gas turbine engine as described and/or claimed herein at cruise may be greater than (or on the order of) any of the following: 10, 15, 20, 25, 30, 35 or 40. The overall pressure ratio may be in an inclusive range bounded by any two of the values in the previous sentence (i.e., the values may form upper or lower bounds), for example in the range of from 20 to 35.

Specific thrust of a turbofan gas turbine engine may be defined as the net thrust of the engine divided by the total mass flow through the engine. At cruise conditions, the specific thrust of an engine as described and/or claimed herein may be less than (or on the order of) any of the following: 800 Nkg-1s, 850 Nkg-1s, 900 Nkg-1s, 950 Nkg-1s, 1000 Nkg-1s, 1050 Nkg-1s, 1100 Nkg-1s, 1150 Nkg-1s, 1200 Nkg-1s, 1250 Nkg-1s, 1300 Nkg-1s, 1350 Nkg-1s, or 1400 Nkg-1s. The specific thrust may be in an inclusive range bounded by any two of the values in the previous sentence (i.e., the values may form upper or lower bounds), for example in the range of from 800 Nkg-1s to 950 Nkg-1s, or 900 Nkg-1s to 1350 Nkg-1s. Such engines may be particularly efficient in comparison with conventional gas turbine engines.

A turbofan gas turbine engine as described and/or claimed herein may have any desired maximum thrust. Purely by way of non-limitative example, a gas turbine as described and/or claimed herein may be capable of producing a maximum thrust of at least (or on the order of) any of the following: 20 kN, 40 kN, 60 kN, 80 kN, 100 kN, 120 kN, 140 kN, 160 kN, 180 kN, or 200 kN. The maximum thrust may be in an inclusive range bounded by any two of the values in the previous sentence (i.e., the values may form upper or lower bounds). Purely by way of example, a gas turbine as described and/or claimed herein may be capable of producing a maximum thrust in the range of from 60 kN to 160 kN, for example 70 kN to 120 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high-pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1500K, 1550K, 1600K, 1650K, 1700K, 1750K, 1800K, 1850K, 1900K, 1950K, or 2000K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K, 2000K, 2050K, 2100K, 2150K, 2200K, 2250K or 2300K. The maximum TET may be in an inclusive range bounded by any two of the values in the previous sentence (i.e., the values may form upper or lower bounds), for example in the range of from 1800K to 2200K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan stage of a turbofan gas turbine engine as described and/or claimed herein may have any desired number of fan blades, for example 12, 14, 16, 18, 20, 22, 24, 26, 28, 30, 32, or 34 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent). Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example, where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the subsonic cruise condition may be any point in the range of from Mach 0.80 to 0.99, for example 0.80 to 0.85, for example 0.85 to 0.90, for example 0.90 to 0.95, for example 0.95 to 0.99, for example in the region of Mach 0.80, in the region of Mach 0.85 or in the range of from 0.80 to 0.85. Any single speed within these ranges may be part of the cruise condition. For some aircraft, the cruise conditions may be outside these ranges, for example below Mach 0.80.

Purely by way of example, the forward speed at the supersonic cruise condition may be any point in the range of from Mach 1.20 to 2.20, for example 1.35 to 2.10, for example 1.50 to 2.05, for example in the region of Mach 2.00 or in the range of from 1.80 to 2.00. Any single speed within these ranges may be part of the cruise condition. For some aircraft, the cruise conditions may be outside these ranges, for example between Mach 1.0 and 1.20, or above Mach 2.20.

Purely by way of example, the supersonic cruise conditions may correspond to standard atmospheric conditions (according to the International Standard Atmosphere, ISA) at an altitude that is in the range of from 11000 m to 19000 m, for example in the range of from 12500 m to 17000 m, for example in the range of from 15000 m to 17000 m (around 56000 ft), for example in the range of from 16000 m to 17000 m, for example in the region of 17000 m. The cruise conditions may correspond to standard atmospheric conditions at any given altitude in these ranges.

Purely by way of example, the subsonic cruise conditions may correspond to an operating point of the engine that provides a known required thrust level (for example a value in the range of from 40 kN to 65 kN) at a forward Mach number of 0.8 and standard atmospheric conditions (according to the International Standard Atmosphere) at an altitude of 38000 ft (11582 m). Purely by way of further example, the supersonic cruise conditions may correspond to an operating point of the engine that provides a known required thrust level (for example a value in the range of from 70 kN to 120 kN) at a forward Mach number of 1.50 and standard atmospheric conditions (according to the International Standard Atmosphere) at an altitude of 56000 ft (17000 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to a further aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to a further aspect, there is provided a method of operating a gas turbine engine as described and/or claimed herein. The operation may be at the cruise conditions as defined elsewhere herein (for example in terms of the thrust, atmospheric conditions and Mach Number).

According to a further aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
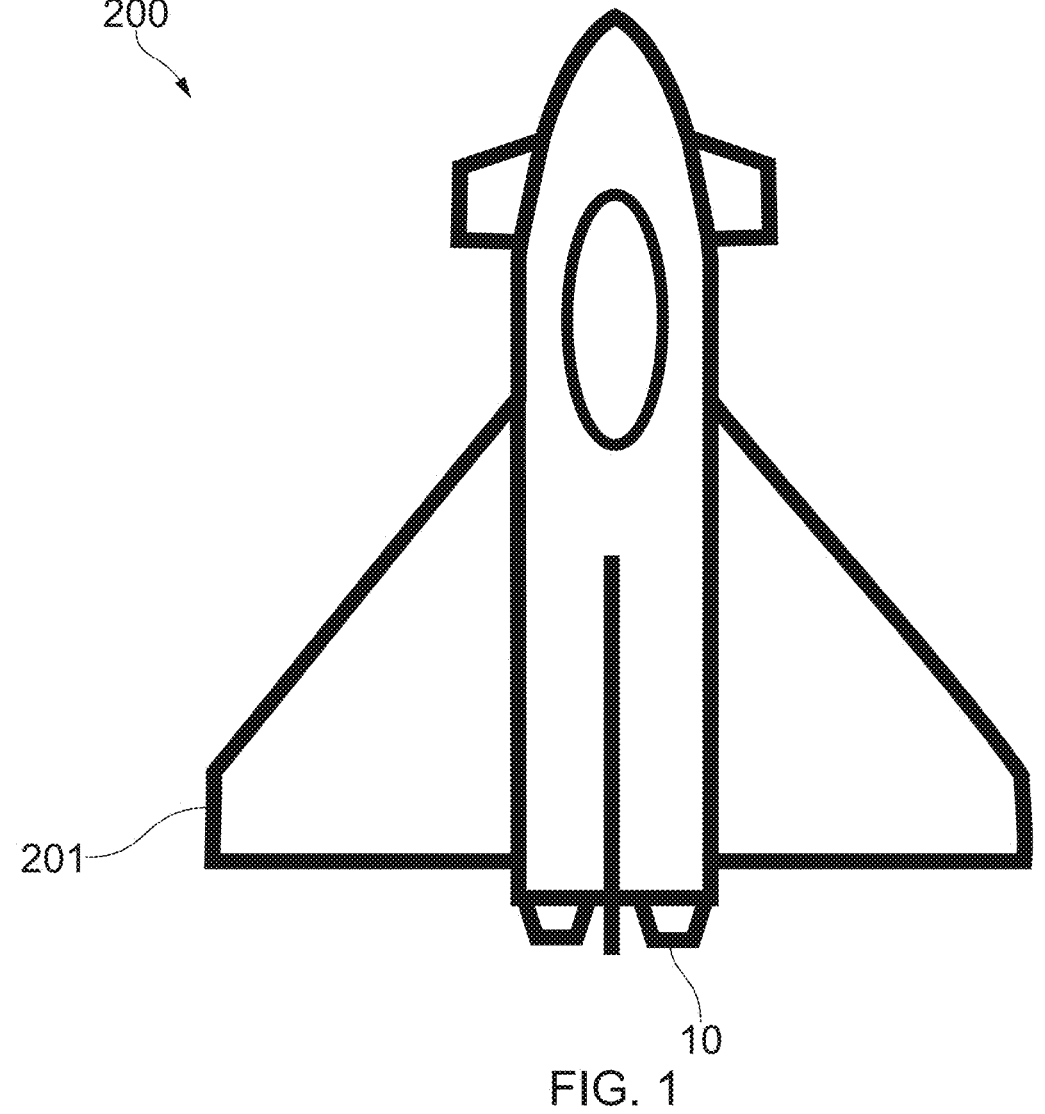
FIG. 1 is a simplified top view of an aircraft comprising an airframe and the gas turbine engine.

FIG. 1 shows a simplified and schematic view of an aircraft 200 comprising an airframe 201 and a gas turbine engine 10. The gas turbine engine 10 may be in accordance with the gas turbine engine 10 described below with reference to FIG. 2.

Figure 2:
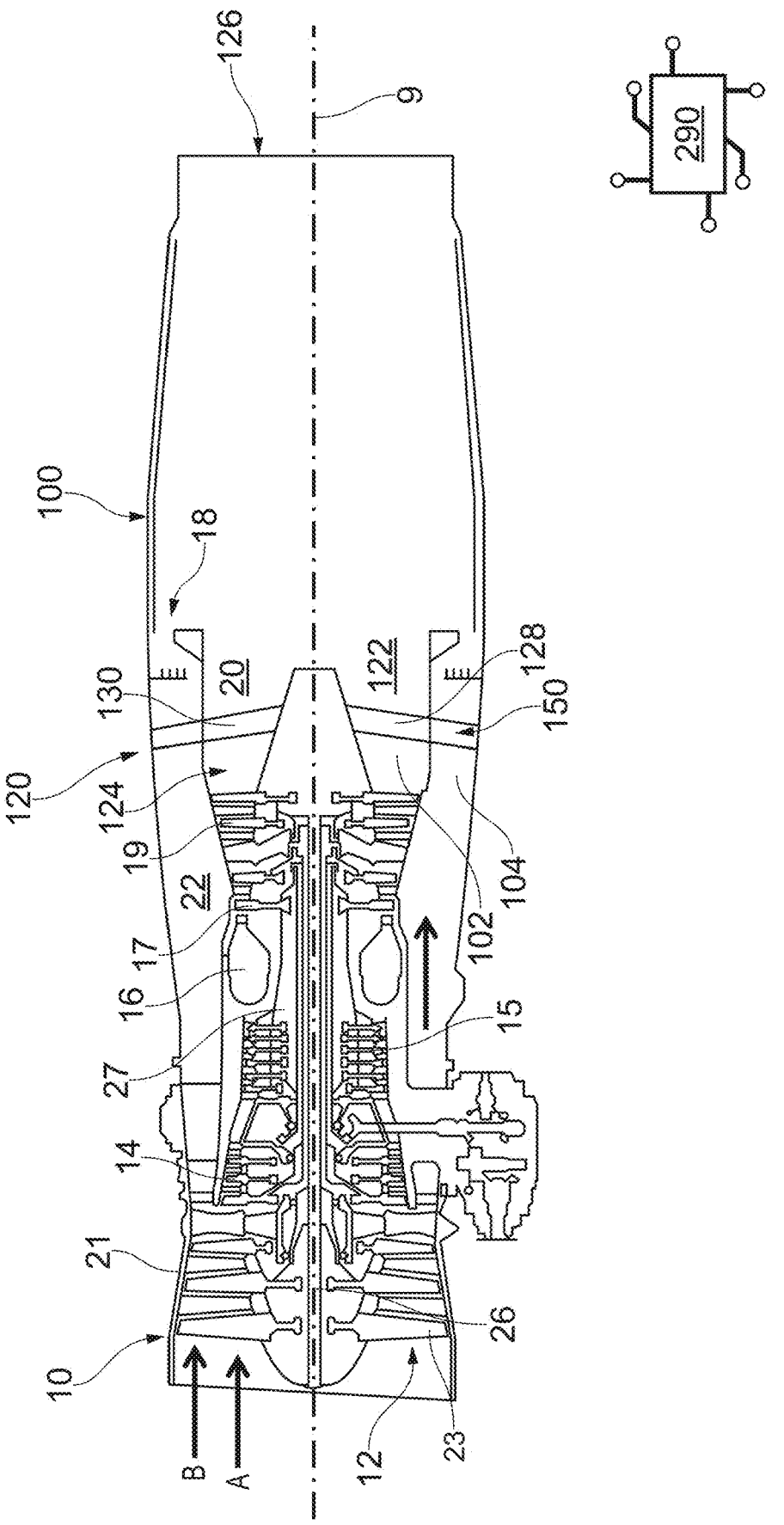
FIG. 2 schematically shows an axial cross-sectional view of a gas turbine engine with an afterburner having a combustor.

FIG. 2 illustrates an example gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low-pressure compressor 14, a high-pressure compressor 15, combustion equipment 16, a high-pressure turbine 17, a low-pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low-pressure turbine 19 via a shaft 26.

In use, the core airflow A is accelerated and compressed by the low-pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high pressure and low-pressure turbines 17, 19 before being exhausted through the nozzle 20 to provide some propulsive thrust. The high-pressure turbine 17 drives the high pressure compressor 15 by a suitable interconnecting shaft 27.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example, or to a duct burner, ramjet, or scramjet. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The gas turbine engine 10 further comprises a controller 290 configured to operate the gas turbine engine 10. The controller 290 is configured to carry out a method of controlling the gas turbine engine described in further detail below with reference to FIG. 6.

The gas turbine engine 10 also comprises an afterburner 100 at the exhaust of the gas turbine engine 10. The example gas turbine engine 10 shown by FIG. 2 may be considered to be a low-bypass ratio engine (as typically used in military aviation applications). However, gas turbine engines in accordance with the present disclosure may be high-bypass ratio engines (as typically used in civil aviation applications). In the example of FIG. 2, the afterburner 100 comprises a core duct 102 and a bypass duct 104 which receive airflow respectively from the core 11 and the bypass duct 22 of the gas turbine engine 10. In some examples, the afterburner may not separate a core duct and a bypass duct, such as in a turbojet which has only a single main gas path.

The afterburner 100 comprises a combustor 120. Accordingly, the gas turbine engine 10 comprises both the combustion equipment 16 described above and the combustor 120. The combustor 120 may therefore be referred to as an auxiliary combustor 120 or a sub-combustor 120. A combustion region 122 extends in an axial direction between an inlet 124 and an outlet 126. The combustion region 122 is configured to receive an airflow through the inlet 124 (i.e., the core airflow A and bypass airflow B from the gas turbine engine 10). The combustion region 122 is configured to discharge the airflow through the outlet 126.

The afterburner 100 may also comprise a further combustor, which may be referred to as a main combustor of the afterburner 100. If so, the gas turbine engine 10 and the main combustor of the afterburner may be generally configured so that a flame resulting from operation of the main combustor is stable (e.g., fundamentally stable) during operation of the gas turbine engine 10 (e.g., during a majority of an operating map of the gas turbine engine 10). The stable flame resulting from operation of the main combustor may be used to reliably hold a flame and thus provide reheat within the afterburner in a typical manner as will be appreciated by those skilled in the art. Accordingly, the main combustor may be configured in order to achieve good combustion, whereas the auxiliary combustor may be otherwise configured within the gas turbine engine 10 to enable use thereof to mitigate thermoacoustic instabilities in the gas flow within the gas turbine engine 10, as is described in further detail below. This enables each combustor to be optimised for different objectives, which may be associated with improved performance.

The combustor 120 comprises a fuel injection port 128 configured to inject fuel into the airflow in the combustion region 122, and a pilot ignition device 130 (best seen in FIGS. 3 and 4) for igniting the discharged by the fuel injection port 128 in the combustion region 122. To this end, the pilot ignition device 130 is disposed downstream of the fuel injection port 128.

In this example, the fuel injection port 128 and the pilot ignition device 130 are integrated into a single component in the form of a vane structure 150, which in this example is an exit guide vane. This minimises the disruption to the airflow in the afterburner 100 and simplifies the arrangement of the gas turbine engine 10 because no additional components are required for incorporation of the combustor 120. However, in other examples, the fuel injection port and the pilot ignition device may be on separately mounted components.

In this example, the vane structure 150 is mounted at the inlet of the combustion chamber 122 such that it is configured to guide the airflow from the inlet 124. In other examples, the vane structure may be mounted in any suitable location to guide the airflow from the inlet 124.

In this example, the vane structure 150 spans across the core duct 102 and the bypass duct 104 of the afterburner 100. In other examples, the vane structure may span only the core duct or only the bypass duct, and/or only part of either duct.

Figure 3:
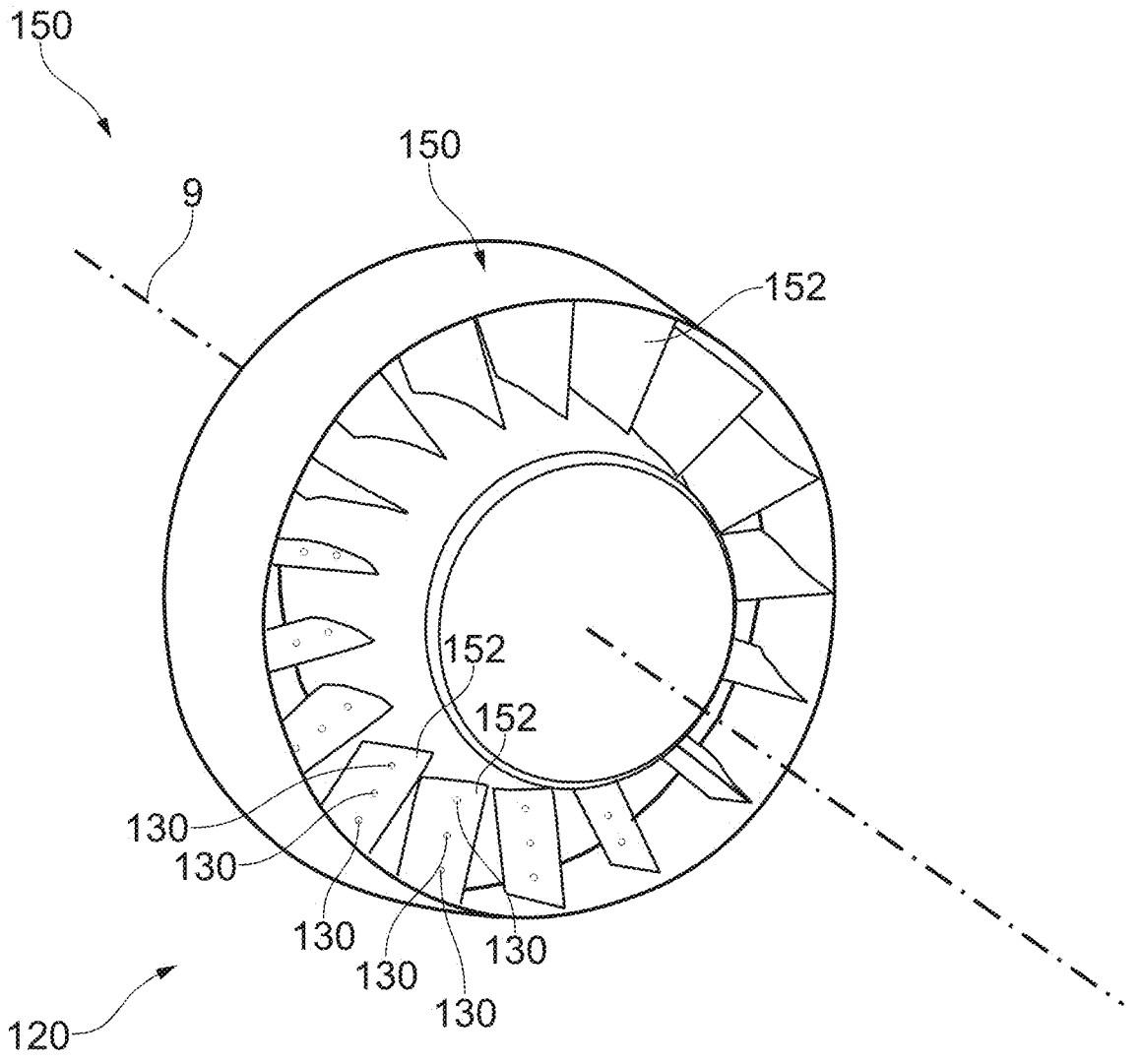
FIG. 3 schematically shows an oblique view of a vane structure of an example combustor suitable for use with the gas turbine engine of FIG. 2.

FIG. 3 shows a vane structure 150 of an example combustor 120 suitable for use as the combustor 120 of the gas turbine engine 10 of FIG. 2. The vane structure 150 in this example comprises a plurality of circumferentially distributed (e.g., around a direction with at least a component parallel to the circumferential direction) and radially extending (e.g., along a direction with at least a component parallel to the radial direction) vanes 152, each of which have an aerodynamic profile to minimise disruption to the airflow.

In the example of FIG. 3, the combustor 120 comprises an array (e.g., a plurality) of pilot ignition devices 130. In this example, the pilot ignition devices 130 are electrical plasma initiation points and are disposed on the vane structure 150 and distributed radially and circumferentially around the vane structure 150 on the plurality of vanes 152. The electrical plasma initiation points use alternating current (AC) or direct current (DC) to energise a space, and thereby to create plasma within the space from gas (e.g., air and fuel or an air-fuel mixture) within the combustion region 122 which, in turn, results in creation of a flame. This merely requires a simple pair of electrodes, and is therefore relatively space efficient. Further, this enables many electrical plasma initiation points to be distributed around the combustion chamber, both radially and circumferentially, to enable plasma to be generated at many different locations from the air and fuel (e.g., an air-fuel mixture) in the airflow which is guided by the vane structure 150. Integration of the electrical plasma initiation points on the vane structure further improves the design of the engine, since any number of electrical plasma initiation points can be disposed on the vane structure 150 and powered through electrical components sheltered within the vane structure 150, without impeding the air flow through the vane structure 150.

In an example in which there is no vane structure, or the pilot ignition device is not integrated with a vane structure, the pilot ignition device may simply comprise an array of electrical plasma initiation points which are distributed radially with respect to and/or circumferentially around the principal rotational axis 9 of the gas turbine engine 10.

Figure 4:
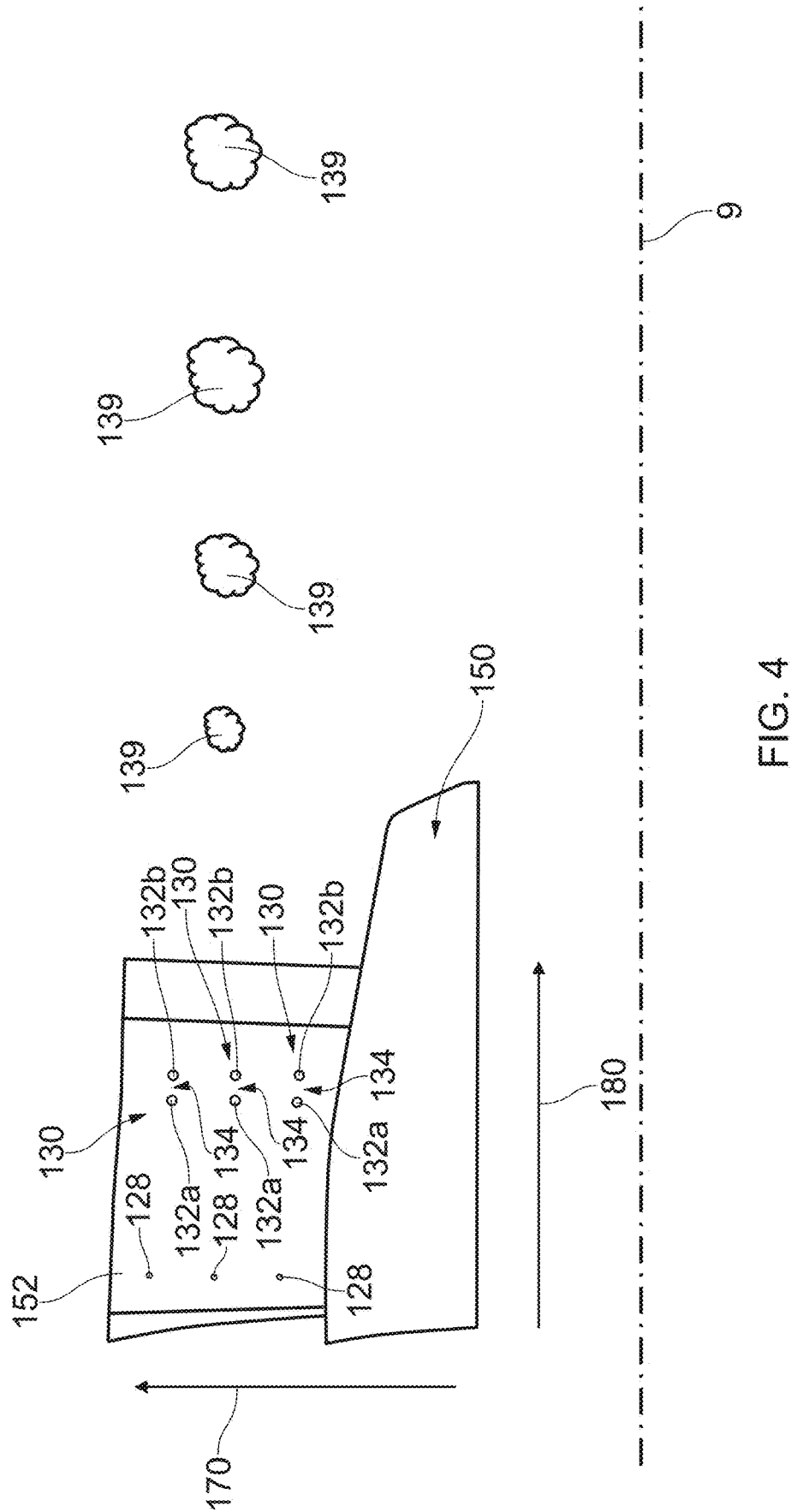
FIG. 4 schematically shows a close-up cross-sectional view of a part of the vane structure.

As shown in FIG. 4, each of the electrical plasma initiation points comprises a pair of electrodes 132a, 132b which are configured to apply a voltage across an electrode gap 134 to produce plasma within the gas (e.g., air and fuel or an air-fuel mixture) passing between the electrodes 132a, 132b, thereby igniting the gas. The electrode gap may be between 1-20 mm wide.

In this example, the electrodes 132a, 132b are disposed on the vane structure 150 within both the core duct 102 and the bypass duct 104 of the afterburner 100. In other examples, they may only be disposed in the core duct 102 or only in the bypass duct 104.

When the pilot ignition device 130 is integrated in the vane structure 150 as shown, the vane structure 150 can then be used to protect the electrodes 132a, 132b and the services to the electrodes 132a, 132b, whilst minimally impeding the airflow through the combustion chamber 122.

In this example, each electrical plasma initiation point 130 comprises a pair of electrodes 132a, 132b on a single vane 152 separated along the axial direction 180 (which is parallel to the principal rotational axis 9 of the gas turbine engine 10) such that an upstream electrode 132a from each electrical plasma initiation point 130 is upstream of a downstream electrode 132b from the respective electrical plasma initiation point 130. The upstream electrode 132a may be configured to be a negatively charged electrode, while the downstream electrode 132b may be configured to be a positively charged electrode, which improves function, as positive ions would move in counter-flow, thereby increasing time of exposure.

In this example, each of the electrical plasma initiation points are distributed in rings around the vane structure 150, with each ring disposed at a different radial extent. In other examples, the radial extent of the electrical plasma initiation points may form any suitable pattern on the vane structure.

In some examples, each electrical plasma initiation point 130 may comprise a pair of electrodes on a single vane 152, and separated along a radial direction 170, perpendicular to the axial direction 180. Therefore, one electrode from each electrical plasma initiation point may be disposed radially outwardly of the other electrode from the respective electrical plasma initiation point.

In other examples, each electrical plasma initiation point 130 may comprise a first electrode on a first vane 152 and a second electrode on a circumferentially adjacent second vane 152, such that the electrode gap spans a space between each vane 152.

In this example, each of the electrodes 132a, 132b of each electrical plasma initiation point 130 is embedded in, and lies flush with, the respective vane 152 on which they are disposed. In other examples, the electrodes may extend out from the surface of the vane. For example, when the pair of electrodes of an electrical plasma initiation point are on adjacent vanes, the electrodes may extend out of the respective vane surface towards one another to reduce the electrode gap between them.

In this example, the vane structure 150 also comprises a plurality of integrated fuel injection ports 128, where each fuel injection port 128 is disposed upstream of the plurality of electrical plasma initiation points on the vane structure 150. In some examples, only the fuel injection ports may be on the vane structure or only the electrical plasma initiation ports may be on the vane structure, or the fuel injection ports, and the electrical plasma initiation ports may be separately mounted from the vane structure.

Although it has been described, with reference to FIG. 3, that the pilot ignition devices 130 are electrical plasma initiation points, it will be appreciated that other types of pilots may be used in apparatuses and methods in accordance with the present disclosure, such as within the vane structure 120 shown by FIG. 3. For example, the pilot ignition devices 130 may be spark discharge points. The pilot ignition device(s) may be more simply referred to as pilot(s).

The gas turbine engine 10 and the combustor 120 are generally configured so that a flame resulting from energisation of the pilot 130 to ignite fuel discharged from the fuel injection port 128 is unstable (e.g., fundamentally unstable) during operation of the gas turbine engine (e.g., during at least a subset of an operating map of the gas turbine engine). More specifically, the combustor 120 is configured so that when the or each pilot ignition device 130 is not energised, a flame cannot be sustained within the combustion region 122 (e.g., is blown-off from the initiation point). Accordingly, a combustive heat release and an associated pressure perturbation as a result of combustion of fuel discharged from the fuel injection port(s) 128 may only be achieved while the corresponding pilot ignition device 130 is creating an electrical plasma/spark. As mentioned above, thermoacoustic instabilities may arise within one or more parts of an operating map of the gas turbine engine. Without wishing to be bound by theory, two types of thermoacoustic instability may develop within a gas turbine engine in use. These are:

(1) "buzz" or "rumble" thermoacoustic instability modes. These modes have an axially orientated wave progression through the gas turbine engine (e.g., a wave progression oriented along the axial direction 180). As the path lengths are relatively long and usually also extend into the cold/low pressure bypass duct (in which the speed of sound is lower than in the core), the characteristic frequencies of these modes are relatively low.

(2) "screech" or "howl" thermoacoustic instability modes. These modes may have a radially orientated wave progression, a circumferentially (e.g., angularly) orientated wave progression, or a combination of these. As the path lengths are short and are generally confined to the core/hot combustion region (in which the speed of sound is high), the characteristic frequencies of these modes are relatively high.

Figure 5:
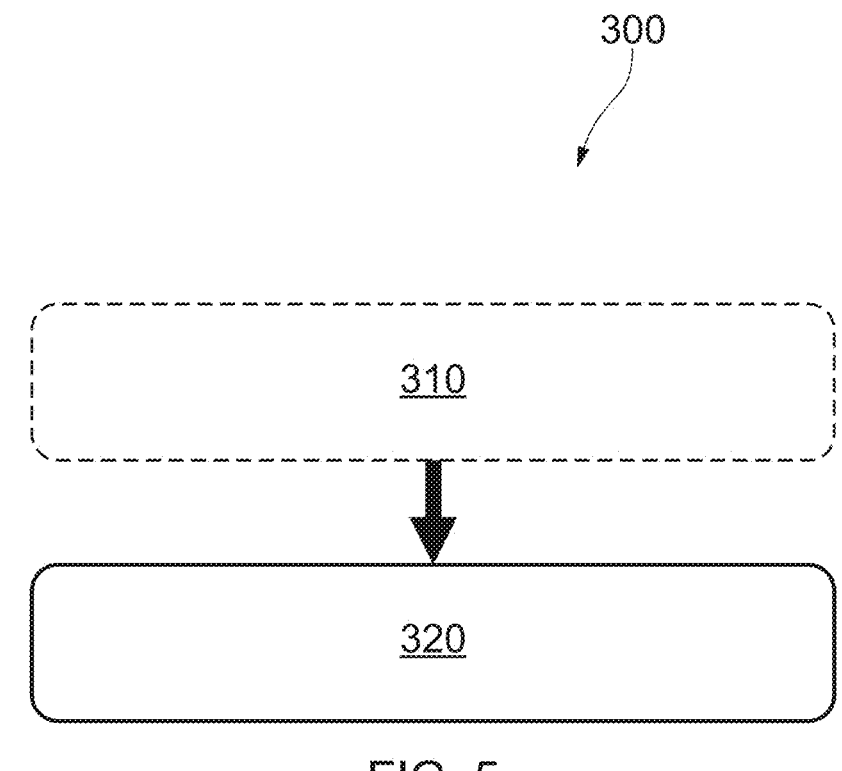
FIG. 5 is a flowchart which shows a method of mitigating thermoacoustic instabilities in a gas flow within a gas turbine engine.

FIG. 5 is a flowchart which shows an example method 300 of mitigating thermoacoustic instabilities in a gas flow within a gas turbine engine comprising a combustor which includes at least one fuel injection port and at least one pilot ignition device (e.g., pilot). The gas turbine engine may, in particular, be in accordance with the gas turbine engines 10 described above with reference to FIGS. 2-4.

The method includes an action of selectively (e.g., discontinuously or repeatedly) energising, at block 320, the pilot 130 to ignite fuel discharged from the fuel injection port 128. Such selective energisation may include periodic energisation (e.g., at a particular frequency, phase and/or duty cycle). In the context of the combustor 120 described above with reference to FIG. 3, the action of selectively energising, at block 320, the pilot 130 to ignite fuel discharged from the fuel injection port 128 includes controlling the electrodes 132a, 132b within the core duct 102 of the afterburner 100 to discontinuously energise. In all cases, the action of selectively energising, at block 320, the pilot 130 to ignite fuel discharged from the fuel injection port 128 is carried out with the intention and the effect of mitigating thermoacoustic instabilities in the relevant gas flow within the gas turbine engine 10 (e.g., within the afterburner 100).

Because the gas turbine engine 10 and the combustor 120 are configured so that a flame resulting from energisation of the pilot to ignite fuel discharged from the fuel injection port is blown-off during at least a subset of the operating map of the gas turbine engine, selective discontinuous energisation of the pilot 130 in said subset of the operating map results in a series of separate flames being formed within the gas flow within the after burner 100 along the axial direction 180. The series of separate flames may be referred to as a street of reacting kernels. A representation of a series of such separate flames/reacting kernels are shown by FIG. 4, in which each separate flame/reacting kernel is denoted by reference sign 139. Each separate flame/reacting kernel 139 is associated with a local pressure perturbation within the gas flow, as will be appreciated by those skilled in the art. As a result, discontinuous energisation of the pilot 130 results in a spatially distributed series of local pressure perturbations being created within the gas flow. The selective energisation, at block 320, of the pilot 130 is performed to create a spatially distributed series of local pressure perturbations which counteract (e.g., moderate) thermoacoustic instabilities within the gas flow (e.g., by means of destructive interference therewith).

To this end, the method may also include an action of monitoring, at block 310, a parameter relating to the gas turbine engine 10. The parameter monitored at block 310 may be a thermofluidic parameter associated with the gas flow within the gas turbine engine 10 or an operational parameter associated with an operating point (e.g., a position on the operating map of) of the gas turbine engine 10. If so, the action of selectively energising, at block 320, the pilot 130 is based on the monitored parameter such that the method 300 includes active control of the energisation of the pilot 130 to mitigate thermoacoustic instabilities within the relevant gas stream.

If the monitored parameter is an operational parameter, the parameter may be selected from a group consisting of: a rotational speed of a shaft of the gas turbine engine 10; a fuel flow into the gas turbine engine 10; a thrust demand from the gas turbine engine 10 and a thrust output from the gas turbine engine 10. For example, if the monitored parameter is a rotational speed of a shaft of the gas turbine engine 10, the action of selectively energising, at block 320, the pilot 130 based on the monitored parameter may include determining a timing (e.g., a phase and/or a frequency) of the energisation of the pilot 130 which is considered to be appropriate to mitigate thermoacoustic instabilities within the relevant gas flow at the monitored rotational speed of the shaft of the gas turbine engine 10 (which may be referred to as a open-loop control regime, as will be understood by those skilled in the art). This may include use of a look-up table which relates the monitored operational parameter to the timing of the energisation of the pilot 130 and/or an analytical mathematical formula relating the monitored operational parameter to the timing of the energisation of the pilot 130.

If the monitored parameter is a thermofluidic parameter, the parameter may be selected from a group consisting of: a local pressure within the gas flow; a local density within the gas flow; a local temperature within the gas flow; a local fluid velocity within the gas flow; and a local viscosity within the gas flow. For example, if the monitored parameter is a local pressure within the gas flow, the action of selectively energising, at block 320, the pilot 130 based on the monitored parameter may include determining a timing (e.g., a phase and/or a frequency) of the energisation of the pilot 130 which reduces (e.g., minimises and preferably substantially eliminates) temporal variations in the monitored local pressure within the gas flow using an appropriate control regime (which may be referred to as a closed-loop control regime, as will be understood by those skilled in the art).

If the combustor 120 comprises a plurality of fuel injection ports 128 and a plurality of pilots 130 (as shown by FIG. 4), the action represented by block 320 in FIG. 5 may include selectively activating each of the plurality of pilots 130 to ignite fuel discharged by a respective one of the plurality of fuel ports 128 so as to mitigate thermoacoustic instabilities in the gas flow. This may include selectively activating a subset (i.e., a group of one or more) of the plurality of pilots 130 at different timings relative to another subset (i.e., another group of one or more) of the plurality of pilots 130.

The combustor 120 may comprise additional pilots and corresponding additional fuel injection ports which are configured so that when the or each additional pilot is not energised, a flame resulting therefrom can be sustained within the combustion region 122 (e.g. the flame is fundamentally stable). For example, each additional pilot may be disposed on a dedicated vane forming part of the vane structure 150 of the combustor 120, with the dedicated vane being designed for a different operating point to the vane(s) on which the pilots 130 and fuel discharge ports 128 during operation of the gas turbine engine 120 to allow stable flame formation by energisation of the additional pilots. That is, the vane(s) on which the pilot(s) and fuel discharge port(s) are disposed may be designed for an unstable operating point within the gas flow during operation of the gas turbine engine 10 to allow discrete reacting kernels to form and remain separate from one another, whereas the vane(s) on which the additional pilot(s) and fuel discharge port(s) may be designed for an stable operating point within the gas flow during operation of the gas turbine engine 10 to allow stable flame formation. This may be achieved by configuring the different vanes to operate at different local flow velocities.

Previously considered techniques for mitigating thermoacoustic instability in gas turbine engines result in significantly compromised performance and/or operability. Such previously-considered techniques include the use of: control system fuel laws within the engine control software, including constraining fuel supply at sensitive operating conditions of the gas turbine engine; passive dampers, such as "Helmholtz" and "Hughes" dampers as will be known to those skilled in the art; "screech choppers", in which where fuel supplied to the afterburner is reduced or removed completely, when a thermoacoustic instability mode is determined to be present within the gas turbine engine; and modulation of air flow and/or fuel flow.

The use of control system fuel laws may result in a significant loss of boost available to a gas turbine engine when applied to, for example, an afterburner. In addition, the use of control system fuel laws may not prevent all occurrences seen in service due to the development of nonconformance to the control system fuel laws by the relevant actuators (e.g., the development of fuel injection faults).

Turning now to the use of passive dampers such as a "Helmholtz" and "Hughes" dampers. The former only offers relatively narrow bandwidth damping (e.g., across a narrow range of thermoacoustic instability mode characteristic frequencies) and may be prone to fuel ingestion and failure. The latter requires a considerable throughflow of air, which in particular may limit the fueling levels achievable in afterburner due to the practicalities of involving air distributed in this way in combustion. Such throughflows of air may be desired for other purposes within the gas turbine engine (e.g., for cooling), and so the allocation of throughflows for this purpose may result in design compromises and hence loss of overall performance. Further, as engine scale increases, the effectiveness of dampers positioned may reduce. Moreover, due to acoustic scaling laws, it is currently thought that only screech modes may be controlled using passive dampers.

With respect to the use of "screech choppers", these may result in a significant loss of boost available to the gas turbine engine. If this occurs during a critical flight phase, for example during take-off, a significant hazard/safety risk will arise. False positive determinations (e.g., false signals) that a thermoacoustic instability mode is present may also cause loss of boost to the gas turbine engine in this way.

While the effectiveness of modulation of inlet gasflow for mitigating thermoacoustic instabilities has been demonstrated at a laboratory scale, no practical means have yet been identified to apply this technique to a full scall gas turbine engine. The size and inertia of the associated valve (s) also limits the characteristic frequencies of the thermoacoustic instability modes at which this approach can be sufficiently useful in practical applications.

Inertia of the electro-hydraulic servo valves, compressibility of fuel, flexibility of manifold pipework, mixing/evaporation/combustion delays all limit the frequencies of the thermoacoustic instability modes at which modulation of fuel can effectively function to mitigate thermoacoustic instabilities in a gas turbine engine. While "smart injectors" may be used to modulate fuel flow at the point where it enters the combustion zone, these may still not adequately function to mitigate thermoacoustic instabilities at modes above the order of hundreds of hertz. Consequently, while such approaches may be able to provide appropriate protection against "buzz" modes, they may not be usable for protecting relatively more problematic "screech" modes (which typically have characteristic frequencies of the order of kilohertz).

In techniques in accordance with the present disclosure, the combustor 120 is usable for (e.g., in the gas turbine engines 10) and is used to (e.g., in the method 300) act as a relatively high-bandwidth actuation mechanism for mitigating (e.g., limiting) combustion-related thermoacoustic instabilities within a gas turbine engine. Advantageously, apparatuses and techniques in accordance with the present disclosure enable both "buzz" and "screech" thermoacoustic instability modes to be mitigated using the same actuation mechanism by virtue of the high bandwidth thereof (e.g., the combustor 120 is usable for and is used to mitigate thermoacoustic instability modes having a relatively wide range of characteristic frequencies).

If the combustor 120 comprises a plurality of fuel injection ports 128 and a plurality of pilots 130 as discussed above, the composition(s) of the group(s) of pilots 130 to energised in the action represented by block 320 of the method 300 and the timings thereof may be tailored accordingly to the particular thermoacoustic instability mode which is desired to be suppressed. This is associated with a higher effectiveness of mitigation of thermoacoustic instabilities in the relevant gas flow. The distribution of pilots 130 radially and circumferentially with respect to the axial direction 180 provides good correspondence with a variety of thermoacoustic instability mode shapes and therefore facilitates improved mitigation of thermoacoustic instabilities in the gas flow.

Figure 6:
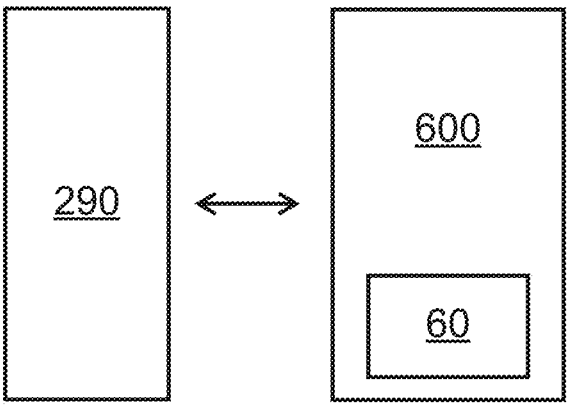
FIG. 6 is a highly schematic diagram of a machine-readable medium having stored thereon a computer program which, when executed by a processor, causes the processor to perform the example method of FIG. 6.

FIG. 6 shows, highly schematically, a machine-readable medium 600 having stored thereon a computer program 60 comprising instructions which, when executed by the controller 290 provided to a gas turbine engine 10 in accordance with the present disclosure (e.g., the gas turbine engines described with reference to FIGS. 2-4), cause the controller 290 to execute the method 300 described above with reference to FIG. 5.

Although the methods and apparatuses described herein have been described in the context of afterburners for gas turbine engines, it will be appreciated that the methods and apparatuses described herein are more broadly applicable within various types of heat engines, and the present disclose envisages such applications. For example, the methods and apparatuses described herein may be applied in the context of ramjets and/or rockets. The present disclosure is also relevant for land, aviation and marine applications in both civil and military contexts.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A method of mitigating thermoacoustic instabilities in a gas flow within a heat engine comprising a combustor including a fuel injection port and a pilot ignition device, the method comprising:

operating the heat engine;

monitoring a parameter relating to the heat engine during operation of the heat engine;

determining that the parameter indicates thermoacoustic instabilities;

discontinuously energising the pilot ignition device, in response to determining that the parameter indicates thermoacoustic instabilities, to ignite fuel discharged by the fuel injection port, wherein the pilot ignition device comprises a pair of electrodes, and blowing off a series of separate flames resulting from the discontinuous energisation of the pilot ignition device across at least a part of an operating map of the heat engine.

2. The method of claim 1, wherein the parameter is a thermofluidic parameter associated with the gas flow within the heat engine or an operational parameter associated with an operating point of the heat engine.

3. The method of claim 1, wherein the combustor comprises a plurality of fuel injection ports and a plurality of pilot ignition devices, and wherein the method comprises:

discontinuously energizing each of the plurality of pilot ignition devices to ignite fuel discharged by a respective one of the plurality of fuel injection ports.

4. The method according to claim 1, wherein the series of separate flames are propagated downstream from the pilot ignition device.

5. A heat engine comprising a combustor and a controller, the controller configured to monitor a parameter relating to the heat engine during operation of the heat engine, the parameter indicative of thermoacoustic instabilities, wherein:

the combustor includes a plurality of fuel injection ports and a plurality of pilot ignition devices that are distributed on vanes of a vane structure;

at least one pilot ignition device of the plurality of pilot ignition devices comprises a pair of electrodes; and the controller is configured to mitigate thermoacoustic instabilities, based the monitored parameter, in a gas flow within the heat engine by discontinuously energising the plurality of pilot ignition devices to ignite fuel discharged from the plurality of fuel injection ports such that a flame resulting from discontinuously energising the plurality of pilot ignition devices to ignite fuel discharged from the plurality of fuel injection ports is blown-off across at least a part of an operating map of the heat engine.

6. The heat engine of claim 1, wherein the parameter is a thermofluidic parameter associated with the gas flow within the heat engine or an operational parameter associated with an operating point of the heat engine.

7. The heat engine of claim 1, wherein:

each pilot ignition device of the plurality of pilot ignition devices comprises a respective pair of electrodes; and the controller is configured to mitigate thermoacoustic instabilities in the gas flow within the heat engine by discontinuously energising each pilot ignition device of the plurality of pilot ignition devices to ignite fuel discharged from a respective one of the plurality of fuel injection ports.

8. The heat engine of claim 7, wherein at least a subset of the plurality of fuel injection ports are radially distributed with respect to a centreline of the heat engine.

9. The heat engine of claim 8, wherein at least a subset of the plurality of fuel injection ports are angularly distributed around the centreline of the heat engine.

10. The heat engine of claim 5, wherein the combustor is an auxiliary combustor, and wherein the heat engine further comprises a main combustor.

11. An aircraft comprising the heat engine of claim 5.

* * * * *